Oct. 16, 1934.  L. H. SCURLOCK  1,977,092
FOOD CONTAINER UNIT
Filed Aug. 24, 1931  2 Sheets-Sheet 2

Inventor
Lewis H. Scurlock
By Arthur F. Durand Atty.

Patented Oct. 16, 1934

1,977,092

UNITED STATES PATENT OFFICE 1,977,092

FOOD CONTAINER UNIT

Lewis H. Scurlock, Chicago, Ill.

Application August 24, 1931, Serial No. 558,996

9 Claims. (Cl. 211—77)

This invention relates to containers for use in kitchens, for holding various food substances or ingredients, in a manner to make the use thereof convenient and easy.

Generally stated, the object of the invention is to provide a novel construction and arrangement whereby a plurality of containers are arranged side by side, approximately in a circle, and removably held on a rotary support, in such a manner that the entire structure is of moderate and convenient size, while at the same time each container is given the maximum capacity possible within the space occupied by the structure as a whole.

It is also an object to provide certain details and features of construction tending to increase the general efficiency and the desirability of a container structure of this particular character.

To the foregoing and other useful ends, the invention consists in matters hereinafter set forth and claimed, and shown in the accompanying drawings, in which—

Fig. 4 is a perspective of one of the containers shown in Figs. 1 and 2, with an intermediate portion thereof shown broken away for convenience of illustration.

Figure 1:
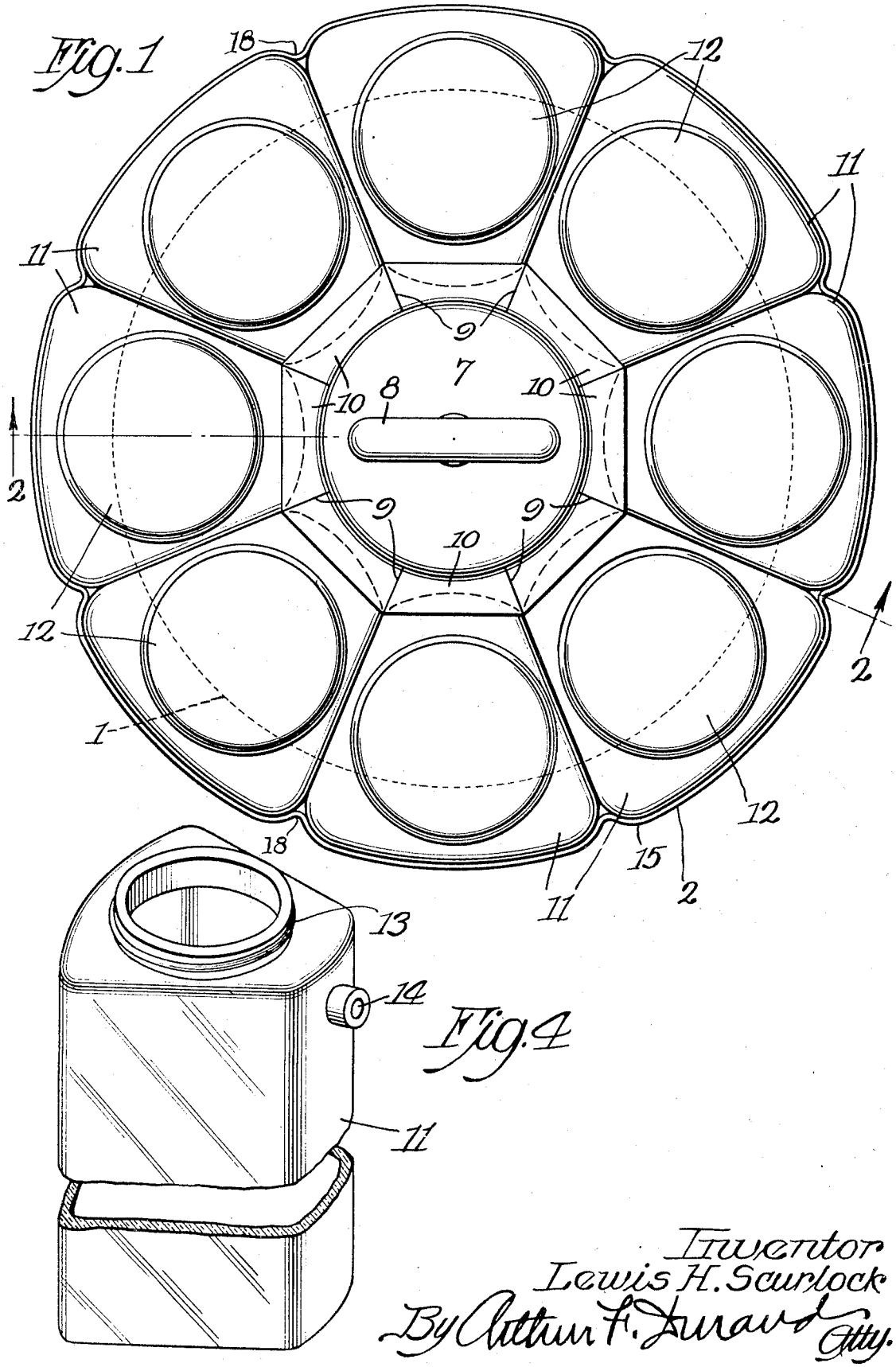
Fig. 1 is a plan view of a container structure embodying the principles of the invention.

As thus illustrated, the invention comprises a base 1, preferably of sheet metal, formed in the manner shown, with a horizontally disposed plate 2 forming a turn-table mounted on said base, with anti-friction balls 3 interposed between the base and the said turn-table. The structure has a central rod or upright 4 which has its lower end screwed into a bushing 5, which latter is attached by a nut 6 to the base 1, said bushing serving to hold the turn-table 2 down in place upon the antifriction balls. At its upper end the upright 4 has a plate 7 held in place by a removable handle 8, which latter is screwed upon the upper end of the said upright. This plate 7 is provided with radial cuts or slots 9, whereby the margin of the plate 7 is divided into spring sections 10 as shown.

The glass containers 11 are each preferably formed as shown, being tapered inwardly when viewed from above, as shown in Fig. 1, whereby their flat sides bear against each other flatwise, and in this way each container has the maximum capacity possible within the area or space occupied by the containers as a whole. Each container has a top cover 12, preferably screwed upon the upper portion 13 of the container, each container being preferably made of glass. If desired, each container may have a pouring spout 14 on the inner side thereof, at or near the top of the container. The base of each container is preferably flat, so that it will rest flatwise on the turn-table 2, and the latter has an outer upturned flange 15 to hold the containers in place. In this connection, it will be seen that the spring portions 10 serve to steady the containers and hold them down upon the turn-table. The corners of the containers are preferably rounded, so that it may be entirely practicable to make them of molded glass.

With the construction shown and described, the container structure as a whole is of moderate and convenient size, and yet each container is of the maximum capacity possible within the area or space occupied by the structure as a whole. All sorts of things may be placed in the containers, for convenient use in the kitchen or elsewhere. Food ingredients, such as salt, pepper, flour, and even liquids may be held in the containers, if the device is to be used in a kitchen. If it is to be used in a chemical laboratory, the containers may hold chemicals of different kinds. In any event, the invention provides a unitary container structure having a plurality of containers arranged in such manner that they can be easily used and in such a manner that the user may easily inspect any labels that are placed upon the containers to show what they contain. By means of the handle 8, the device can be picked up and carried around in an easy and convenient manner. By whirling the turn-table with the containers thereon, the desired container can be brought within easy reach of the user. In addition, the containers, being of glass or similar material, are sanitary, as they can be washed and thoroughly cleaned. If the containers are made of transparent glass, the whole structure can be ornamental as well as useful, and may be used in different places, such as drug stores, where they may contain candies or other bright colored commodities.

It will be understood that the upright or rod rotates, the bushing and the nut at the lower end thereof being so fastened in place that they may rotate with the rod, whereby everything at the top of the rod will also rotate about the vertical axis.

Figure 2:
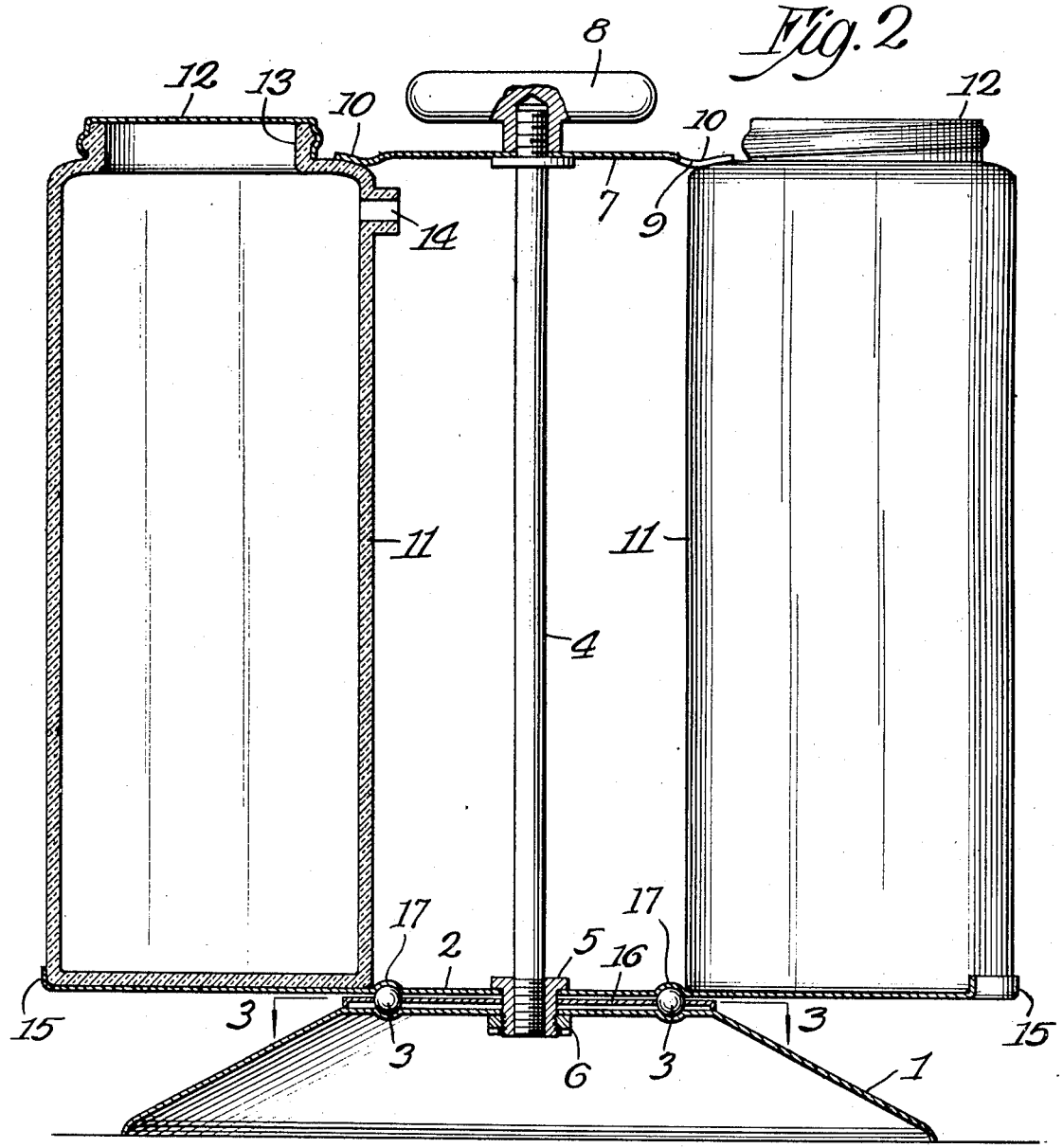
Fig. 2 is a vertical section on line 2—2 in Fig. 1.
Figure 3:
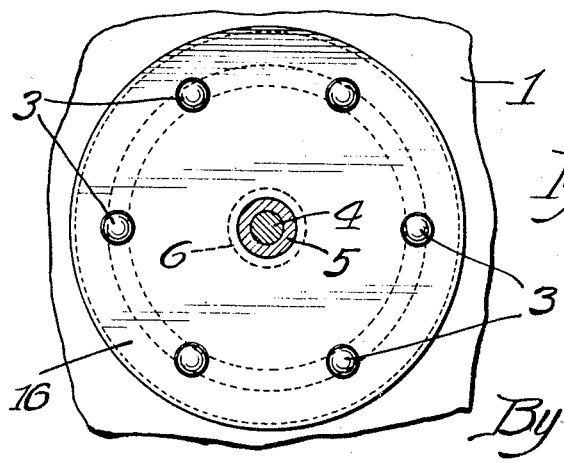
Fig. 3 is a horizontal section on line 3—3 in Fig. 2.

Preferably, the sheet metal plate 16, with holes therein for the balls 3, is interposed between the base 1 and the turn-table 2, in the manner shown in Fig. 2 of the drawings. In this way the sheet metal base 1 forms one ball race, and the turn-table 2 forms the other ball race of a step bearing.

The upper ball race 17 forms a head that engages the inner sides of the containers, at their bottoms, to hold the containers in place, against inward displacement, when they are not all in place on the turn-table. Also, at such time, the peripheral notches 18 hold the containers against separation. Thus, in effect, the container structure comprises a plurality of compartments, each compartment being removable independently, whereby the compartments form sections of the container as a whole. It will be seen that the depressions or notches or dents 18, which appear in the edge or periphery of the rotary support 2, when the latter is viewed from above, define the radial divisions between the compartments or containers, whereby if the container is in position without other containers at opposite sides thereof, it will nevertheless be sufficiently properly located on said support. In other words, this peripheral formation of the rotary support serves to define an accurate position for each compartment or container, with means preventing displacement of the containers except when they are lifted slightly and moved outward bodily in the manner explained. A plurality of wedge-shaped and flat-sided containers, grouped together for rotation about a vertical axis, without any positioning means between their opposing sides, is broadly new. It will also be seen that it is advantageous and broadly new to provide a rotary support with peripheral notches or depressions defining the radial divisions between the wedge-shaped containers. Preferably, in using the broad idea, it is advantageous to make the containers or jars of glass so that they will expose to view the contents thereof. In harmony with that, it is also preferable, as shown and described, to employ a ball bearing on the bottom of a rotary support. Thus, in making efficient use of the broad idea, only a slight touch is necessary to whirl the group of specifically shaped transparent containers, of maximum capacity but within a relatively smaller circle, in order to bring any particular container within convenient reach of the user. Thus, in the practical use of the broad idea, a group of containers arranged on a smaller circle, but practically without reducing the capacity thereof, is provided in a structure that can be whirled or turned with a minimum of effort. Thus, a great saving of time and effort is accomplished, as in kitchen work, by employing a group of glass containers of wedge-shaped form on a ball bearing rotary support, as in the exemplification of the invention shown and described.

What I claim as my invention is:

1. In a rotary container structure adapted to receive and support a group of circularly arranged wedge-shaped containers, adjacent containers having opposed flat radially extending sides forming radial divisions therebetween, the combination with a base, of a container support rotatably mounted on said base, the periphery of said container support being provided with re-entrant portions intermediate the positions normally occupied by adjacent containers and defining the radial divisions therebetween, and means on said support adapted to engage the lower portions of the containers to resist outward movement of the latter.

2. A structure as specified in claim 1, said re-entrant portions providing the support with peripheral notches, and said engaging means comprising flanges extending along the sides of each notch.

3. In a rotary container structure adapted to receive and support a group of circularly arranged wedge-shaped containers, adjacent containers having opposed flat radially extending sides forming radial divisions therebetween, the combination with a base, of a container support rotatably mounted on said base, the periphery of said container support being provided with re-entrant portions intermediate the positions normally occupied by each pair of adjacent containers and defining the radial divisions therebetween, means on said support adapted to engage the lower portions of the containers to resist outward movement of the latter, and resilient means carried by said container support and axially mounted thereon at the top thereof to rotate therewith, having outer edge portions to yieldingly engage said containers to releasably maintain the latter against unintentional displacement.

4. In a rotary container structure adapted to receive and support a group of circularly arranged wedge-shaped containers, adjacent containers having opposed flat radially extending sides forming radial divisions therebetween, the combination with a base, of a container support rotatably mounted on said base, the periphery of said container support being provided with upstanding flange means adapted to engage outwardly facing sides of said containers and having re-entrant portions intermediate the positions normally occupied by said containers and defining said radial divisions therebetween, serving to maintain the containers against both outward and circumferential displacement.

5. In a rotary container structure adapted to receive and support a group of circularly arranged wedge-shaped containers, adjacent containers having opposed flat radially extending sides, the combination with a base, of a container support rotatably mounted on said base, the periphery of said container support being provided with upstanding flange means adapted to engage outwardly facing sides of said containers and having re-entrant portions intermediate the positions normally occupied by said containers and defining said radial divisions therebetween, serving to maintain the containers against circumferential displacement, and centrally disposed resilient means carried by said support adapted to engage the upper sides of said containers.

6. A structure as specified in claim 1, said engaging means being formed and disposed in position to extend a distance between the containers to resist lateral or sidewise circumferential displacement of the containers, as well as the said outward displacement thereof.

7. In a rotary container structure adapted to receive and support a group of containers with their outer sides on the line of a circle, the combination with a base, of a container support rotatably mounted on said base, the periphery of said support being formed with re-entrant portions alternating with upturned retaining flanges for engaging the outer sides of the containers, serving to assist in assembling the latter thereon.

8. In a rotary container structure adapted to receive and support a container group including a plurality of circularly arranged wedge-shaped glass containers with their exposed outer sides on the line of the circle, adjacent containers having opposed flat radially extending sides forming radial divisions therebetween, with rounded outer corners, the combination with a base, of a container support rotatably mounted on said base, said support having integral formations defining said divisions, disposed in position to extend inwardly from said circle and partially between the rounded outer corners of the containers, formed to resist circumferential and radial displacement of said containers.

9. In a rotary container structure adapted to receive and support a container group including a plurality of circularly arranged wedge-shaped glass containers with their exposed outer sides on the line of the circle, adjacent containers having opposed flat radially extending sides forming radial divisions therebetween, with rounded outer sides, the combination with a base, of a container support rotatably mounted on said base, said support having integral formations defining said divisions, formed to resist circumferential displacement of said containers, and having other integral formations to resist radial displacement thereof, the periphery of said rotary support having as many notches extending inwardly from said circle as there are containers indicated thereon.

LEWIS H. SCURLOCK.